Jan. 21, 1930.   H. C. WOOD   1,744,431
TIRE BALANCING MECHANISM
Filed June 27, 1928
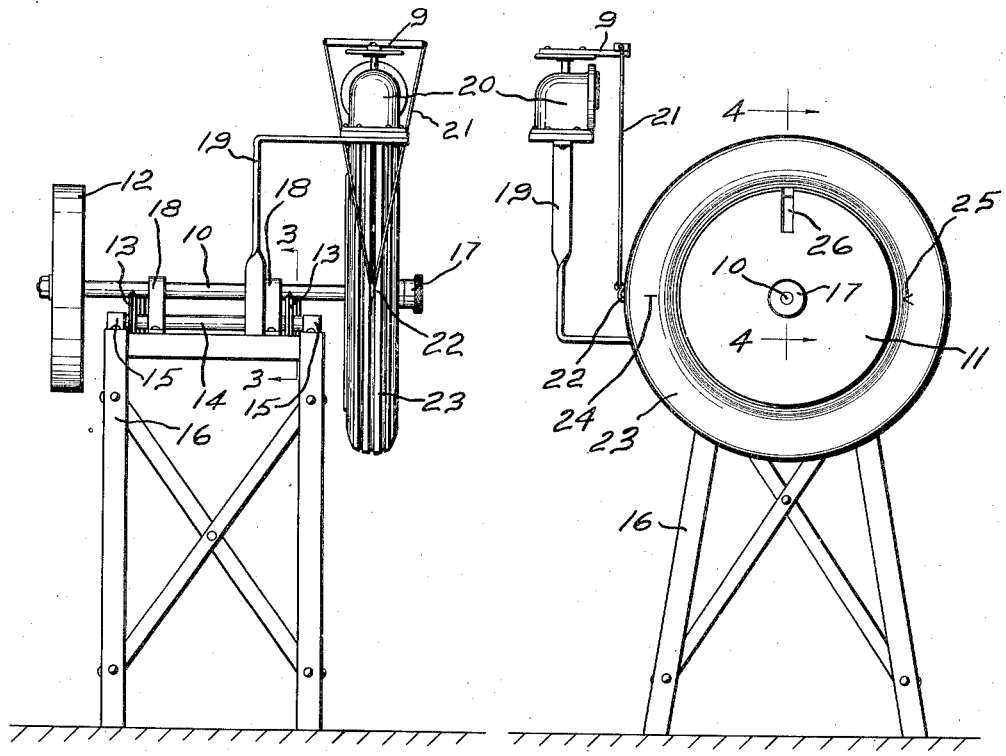
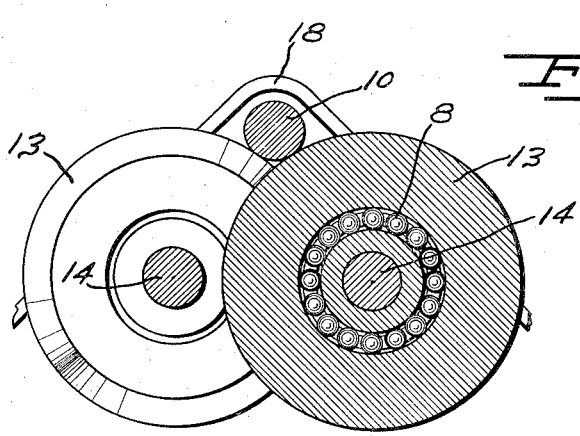
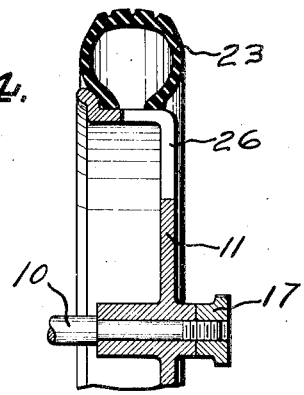
INVENTOR.
HARLEY C. WOOD.
BY
ATTORNEY.

Patented Jan. 21, 1930

1,744,431

UNITED STATES PATENT OFFICE

HARLEY C. WOOD, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

TIRE-BALANCING MECHANISM

Application filed June 27, 1928. Serial No. 288,686.

My invention relates to devices for determining whether or not pneumatic tire casings are in balance about the transverse axis of their annulus.

Tire casings from various causes are frequently out of balance, a condition which tends to cause what is known as "tire shimmy," when the tire is in use, and to lessen the life of the casing.

It is among the objects of my invention to provide a device by means of which the fact that the tire is out of balance may be easily determined. A further object is to provide means for determining the extent to which the tire is out of balance to enable correction, or the placing of the inner tube in the tire in a position such that the weight of the valve will tend to counterbalance the casing. Other and further objects will be apparent from the following specification and claims.

In the drawings which illustrate one embodiment of my invention,

Fig. 1 is a side view of the device showing a tire in place;

Fig. 2 is a front view of the device as shown in Fig. 1;

Fig. 3 is a sectional view substantially on line 3—3 of Fig. 1; and

Fig. 4 is a fragmentary sectional view substantially on line 4—4 of Fig. 2.

Referring to the drawings, 10 designates a shaft provided at one end with a tire supporting drum 11 and at the other end with a wheel 12 designed to approximately counterbalance the dead weight of the drum 11 and the tire. Shaft 10 is mounted for free rotation upon pairs of edge bearing rollers 13. These rollers have relatively sharp edges, making slight surface contact with shaft 10, and are rotatably mounted in ball bearings 8 on fixed shafts 14 secured at 15 to frame 16. This arrangement for supporting shaft 10 permits the latter to rotate with a minimum of friction and renders the device responsive to a slight degree of off balance in the tire. The wheel 12 and the tire supporting drum 11 are separately balanced circumferentially about their axes, permitting the use of various drum sizes without disturbing the axial balance of the device as a whole. The drum 11 is removably secured to shaft 10 in any suitable manner as by hand nut 17. A pair of straps 18 secured to the frame and arching over shafts 10 and 14 prevent accidental displacement of shaft 10 from its seat on the rollers 13.

For the purpose of ascertaining the degree to which the tire is off balance I provide an indicating weighing scale 20 which in itself may be of any suitable construction. Scale 20 is mounted substantially in the plane of the tire supporting drum 11 by means of an angular shaped bracket 19 secured to the frame 16. In the form shown a T-shaped arm 9 is secured to the platform of the scale 20, and depending from arm 9 is a cord 21 provided at its lower end with a hook 22 adapted to engage the tread portion of the tire 23 as shown in Figures 1 and 2. Arm 9 is of such length as to bring cord 21 vertical when hook 22 is engaged with the tire tread on the horizontal diameter of the tire. Arm 9 may be made adjustable if desired to accurately maintain this relationship.

In operation a tire 23 to be balanced is placed upon the tire supporting drum 11 and the balancing unit together with the tire is given a slight rotation and permitted freely to come to rest whereupon a mark 24 is placed upon the tire directly below the shaft 10. The unit is then rotated a quarter turn to permit the hook 22 to be engaged in the tread of the tire at the mark 24 and the amount of off-balance may then be read from the indicator of scale 20. If the off-balance is within the allowed tolerance the tire may be removed or if the tire is outside of the allowed tolerance or it is is desired to accurately balance the tire a mark 25 may be placed opposite mark 24, the tire removed and additional weight added to the portion 25, as by the application of rubber cement on the inner surface of the tire after which the tire may again be checked for balance. If it is desired to utilize the weight of the valve stem to reduce the off-balance a permanent marking 25 may be applied to indicate that the inner tube is to be inserted with the valve at that point.

It is sometimes desired to balance the tire casing with the inner tube in place and to permit this I form a slot 26 in the face and rim of drum 11 to accommodate the valve stem.

Having thus described one embodiment of my invention, I claim:

1. A tire balancing device comprising a freely rotatable shaft provided at one end with a tire receiving drum and at the other end with a wheel approximately equal in weight to the tire receiving drum with a tire positioned thereon, and an anti-friction bearing supporting said shaft, intermediate the wheel and tire receiving drum.

2. A tire balancing device comprising a freely rotatable shaft provided at one end with a tire receiving drum and at the other end with a wheel approximately equal in weight to the tire receiving drum with a tire positioned thereon, the wheel and drum being severally balanced circumferentially, and an anti-friction bearing supporting said shaft intermediate the wheel and tire receiving drum.

3. A tire balancing device comprising a freely rotatable circumferentially balanced drum having its peripheral surface formed as a tire receiving rim, weight indicating means, and means to connect the weight indicating means to a tire supported on the drum, the weight indicating means being so positioned with respect to the drum that upon attachment of the connecting means to the tire drum assembly when the said assembly has been rotated from its position of equilibrium, the amount of unbalanced weight in the tire will be indicated by the weight indicating means.

4. A tire balancing device comprising a freely rotatable shaft provided at one end with a tire receiving drum and at the other end with a wheel approximately equal in weight to the tire receiving drum with a tire positioned thereon, said drum and wheel being balanced circumferentially, an anti-friction bearing supporting said shaft intermediate the wheel and tire receiving drum, weight indicating means, and means to connect the weight indicating means to a tire supported on the drum, the weight indicating means being so positioned with respect to the drum that upon attachment of the connecting means to the tire-drum assembly when the said assembly has been rotated from its position of equilibrium, the amount of unbalanced weight in the tire will be indicated by the weight indicating means.

5. In a tire balancing mechanism comprising a support, a plurality of rollers on the support, a shaft adapted to be supported by the rollers, a tire supporting drum on one end of the shaft and a counter-balance wheel on the other end of the shaft.

6. In a tire balancing mechanism comprising a support, a pair of parallel shafts mounted on the support, freely rotatable edged supporting rollers on the shaft, a shaft adapted to be supported by the rollers, a removable tire supporting drum at one end of the shaft, a counter-balance wheel on the other end of the shaft, said drum and wheel being severally circumferentially balanced.

HARLEY C. WOOD.